United States Patent [19]
Keith

[11] Patent Number: 5,810,976
[45] Date of Patent: *Sep. 22, 1998

[54] DEVICE FOR PROCESSING WATER HAVING HIGH CONCENTRATIONS OF SCALE FORMING COMPOUNDS AND HIGH SOLIDS CONTENT IN A HIGH EFFICIENCY VAPOR COMPRESSION DISTILLATION SYSTEM

[75] Inventor: Robert C. Keith, Santa Ana, Calif.

[73] Assignee: Grand Environmental Corporation, Santa Ana, Calif.

[*] Notice: The term of this patent shall not extend beyond the expiration date of Pat. No. 5,587,054.

[21] Appl. No.: 771,658

[22] Filed: Dec. 23, 1996

[51] Int. Cl.⁶ ........................................................ B01D 3/10
[52] U.S. Cl. .......................... 202/182; 202/172; 202/176; 202/186; 202/202; 202/205; 203/91; 159/24.1; 159/28.6; 159/46; 159/DIG. 16; 159/DIG. 30; 165/165; 165/166
[58] Field of Search ..................................... 202/172, 182, 202/186, 202, 205; 159/24.1, 28.6, 46, DIG. 16, DIG. 30, 11.1; 203/23–26, 91, DIG. 8; 165/165–166, 108, 109.1, 95

[56] References Cited

U.S. PATENT DOCUMENTS

| | | | |
|---|---|---|---|
| 3,848,187 | 11/1974 | Rohrback et al. | 422/105 |
| 3,856,078 | 12/1974 | Dahl | 165/108 |
| 4,246,961 | 1/1981 | Chaix et al. | 165/143 |
| 4,863,567 | 9/1989 | Raley | 202/182 |
| 4,966,227 | 10/1990 | Andersson | 165/167 |
| 5,419,814 | 5/1995 | Kunihiro et al. | 159/28.6 |
| 5,466,344 | 11/1995 | Lindke | 202/202 |
| 5,499,639 | 3/1996 | Williams, Jr. | 165/95 |
| 5,587,053 | 12/1996 | Keith | 202/172 |
| 5,587,054 | 12/1996 | Keith | 202/172 |

*Primary Examiner*—Hien Tran
*Attorney, Agent, or Firm*—Brady, O'Boyle & Gates

[57] ABSTRACT

A device for processing water having high concentrations of scale forming compounds and high solids content in a high efficiency vapor compression distillation system wherein a plate-in-frame heat exchanger is submerged in a boiling solution contained in a boiler drum. An impeller in the drum continuously circulates the boiling solution through the heat exchanger at a velocity to prevent suspended solids from accumulating and to inhibit scale formation on the boiling surfaces of the heat exchanger.

9 Claims, 4 Drawing Sheets

# DEVICE FOR PROCESSING WATER HAVING HIGH CONCENTRATIONS OF SCALE FORMING COMPOUNDS AND HIGH SOLIDS CONTENT IN A HIGH EFFICIENCY VAPOR COMPRESSION DISTILLATION SYSTEM

BACKGROUND OF THE INVENTION

In Applicant's pending patent application Ser. Nos. 08/320,233 and 08/320,235 filed Oct. 11, 1994 now U.S. Pat. Nos. 5,587,053 and 5,587,054, respectively, the disclosures of which are incorporated herein by reference, there are disclosed a boiler and condenser device including a plate-in-frame heat exchanger employed in a vapor compression distillation system. When processing feed streams containing high concentrations of scale forming compounds, it has been found that scale accumulates on the surfaces of the boiling chambers because of the stagnate water in the boiling chambers and the dry spots which form on the partially submerged surfaces of the boiling chambers. Also, when processing feed streams containing high concentrations of suspended or dissolved solids, it has been found that the concentration of the feed stream causes suspended solids to settle out of suspension, and the dissolved solids to precipitate out of solution. These released solids accumulate in the boiling chambers and interfere with the efficient operation of the plate-in-frame heat exchanger if not continuously removed from the boiling chambers.

To allow the boiler and condenser device and associated vapor compression distillation system disclosed in the aforementioned pending applications to operate at a high level of energy efficiency while processing feed streams having high solids content and high concentrations of scale forming compounds, the device of the present invention has been devised.

SUMMARY OF THE INVENTION

The device of the present invention comprises essentially a boiler drum containing a plate-in-frame heat exchanger of the type disclosed in the above-noted pending patent application Ser. No. 08/320,233 filed Oct. 11, 1994 now U.S. Pat. No. 5,587,053, wherein a plurality of alternating boiling and condensing chambers are provided, whereby the interior surface of each condensing chamber forms a condensing surface, and the exterior surface of each condensing chamber forms a boiling surface. The boiler drum contains a volume of boiling solution, and the plate-in-frame heat exchanger is submerged in the boiling solution. The condensing chambers are sealed from the boiling solution in the drum, but the boiling chambers communicate with the solution in the drum and provide spaces between adjacent condensing chambers to form interpasses for the solution in the drum. An impeller is mounted in the lower portion of the drum for continuously circulating the boiling solution and concentrate up through the interpasses between adjacent condensing chambers. The impeller imparts sufficient velocity to the boiling solution to prevent suspended solids from accumulating on the boiling surfaces and also inhibits scale formation on the boiling surfaces. A portion of the boiling solution is vaporized and flows outwardly from the drum through a blower and into the condensing chambers.

The boiler drum and associated plate-in-frame heat exchanger are incorporated in a high efficiency vapor compression distillation system of the type disclosed in the above-noted pending patent application Ser. No. 08/320,235 filed Oct. 11, 1994 now U.S. Pat. No. 5,587,054, which also may include a source of scale inhibiter adapted to be metered into the incoming feed water.

DESCRIPTION OF THE PREFERRED EMBODIMENTS

Figure 1:
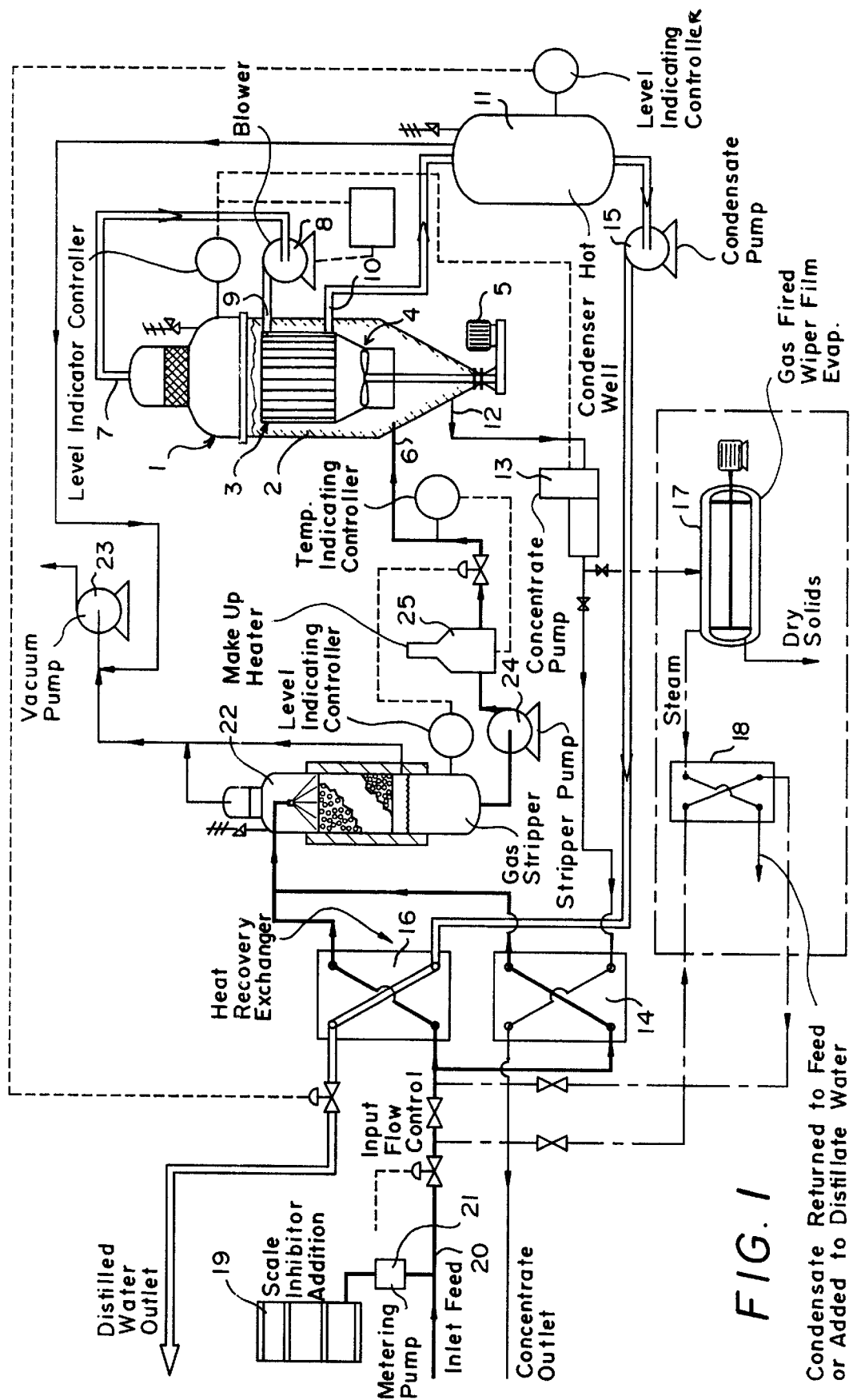
FIG. 1 is a flow diagram of a vapor compression distillation system employing the boiler drum device of the present invention.
Figure 2:
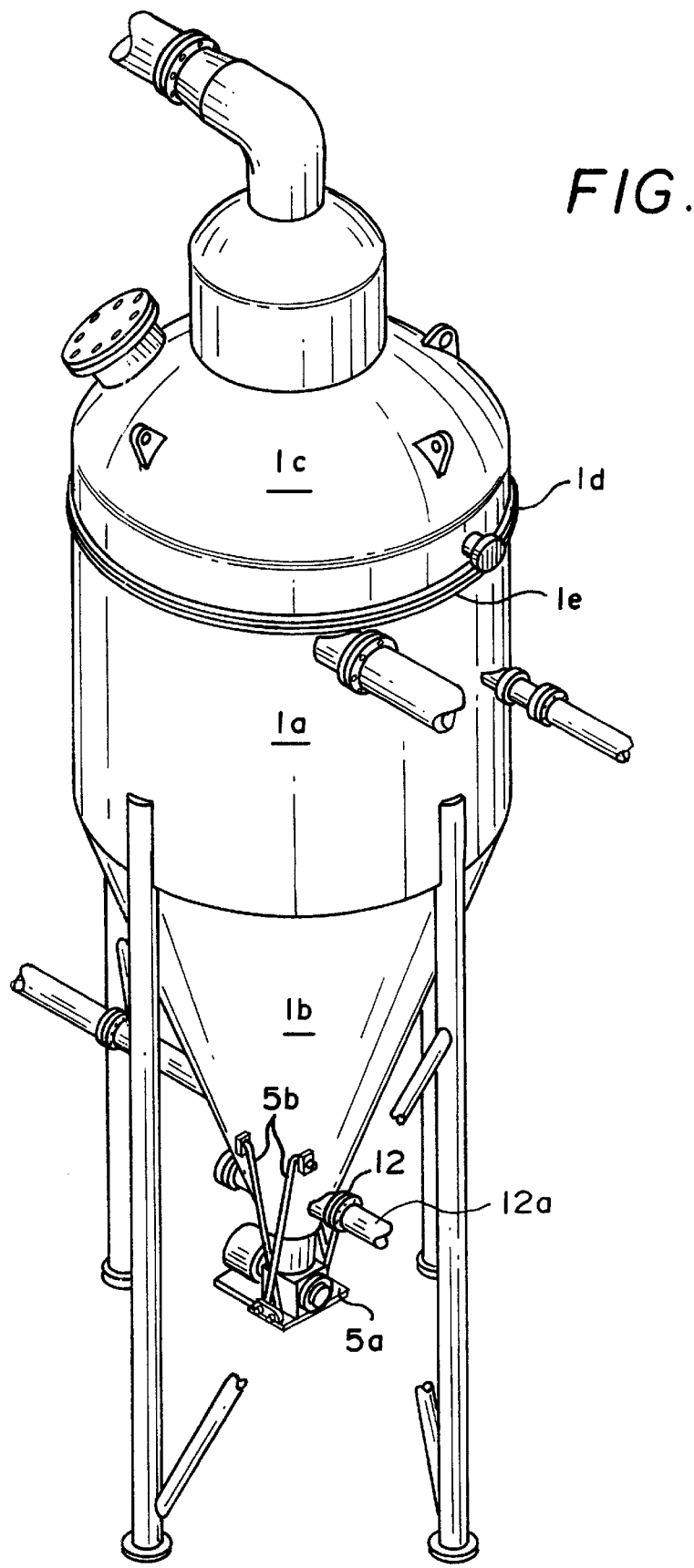
FIG. 2 is a perspective view of the boiler drum employed in the system of FIG. 1.

Referring to the drawings and, more particularly to FIG. 1, the device 1 of the present invention comprises a boiler drum 1 containing a volume of a boiling solution 2. A plate-in-frame heat exchanger 3, of the type disclosed in U.S. Pat. No. 5,587,053 is mounted in the boiler drum 1 and is submerged in the boiling solution 2. An impeller 4 driven by a motor 5 is mounted in the lower portion of the boiler drum for circulating the boiling solution 2 through the boiling chambers in the heat exchanger 3. The boiling solution enters the bottom portion of the boiler drum 1 through an inlet 6.

The heat exchanger 3 includes a plurality of alternating boiling and condensing chambers, whereby the interior surface of each condensing chamber forms a condensing surface, and the exterior surface of each condensing chamber forms a boiling surface. The condensing chambers are sealed from the boiling solution 2 in the drum 1, but the boiling chambers are open to the boiling solution 2 and provide spaces between adjacent condensing chambers, to thereby provide interpasses for the boiling solution 2 in the drum. By this construction and arrangement, the boiling solution 2 flowing through the interpasses is heated by the boiling surfaces of the condensing chambers. A portion of the boiling solution 2 is vaporized, and the vapor flows through an outlet 7 on the top of the drum 1, through a blower 8 and into an inlet 9 to the condensing chambers of the heat exchanger 3. The condensate flows from the condensing chambers through an outlet 10 to a condensate hot well 11. The concentrate from the boiling chambers flows through an outlet 12 at the bottom of the boiler drum 1 to a concentrate pump 13. From the pump 13, the concentrate is fed to a heat exchanger 14 employed for preheating the inlet feed. Similarly, the condensate from the hot well 11 flows to a condensate pump 15 which pumps the condensate to another heat exchanger 16 which can also be employed for preheating the inlet feed.

As an alternate, the concentrate from the pump 13 can be fed to a gas fired wiped film evaporator 17 wherein the vapor therefrom flows through a heat exchanger 18 for preheating the inlet feed. The condensate formed in the heat exchanger 18 can be selectively fed into the inlet feed or to the distilled water outlet.

A source of scale inhibitor 19 communicates with the feed inlet line 20 and is fed to the incoming feed line 20 through a metering pump 21.

The preheated liquid feed material to be purified enters a gas stripper 22 wherein noncondensable gases are extracted from the top of the stripper 22 by a vacuum pump 23. The degassed feed flows from the bottom of the stripper 22 to a pump 24. The pump 24 pumps the feed to a make up heater 25 from which the heated liquid feed material flows through the inlet 6 to the boiler drum 1.

The vacuum pump 23 not only communicates with the stripper 22 but also with the condensate hot well 11, to thereby provide the system with a vacuum, whereby the temperature of the boiling chambers is matched with the temperature of the incoming feed material. The details of the construction of the boiler drum 1 are shown in FIGS. 2 to 5, wherein it will be seen that the drum includes a cylindrical body portion 1a having a layer of insulation 1a on the outer surface thereof and a depending integral conical portion 1b and a semi eliptical top portion 1c having a circumferential flange 1d adapted to be fastened to a corresponding flange 1e on the top edge of the cylindrical body portion 1a. The plate-in-frame heat exchanger 3 is mounted in the cylindrical body portion 1a and spaced inwardly from the sidewall thereof. The heat exchanger 3 is provided with a tunnel 3a having a depending conical portion 3b terminating in a cylindrical portion 3c.

The impeller 4 is positioned in the tunnel 3a between the conical portion 3b and the cylindrical portion 3c. The drive shaft 4a for the impeller 4 extends downwardly through the conical end 1b of the drum 1 and is connected to the motor 5 supported on a platform 5a secured to the conical portion 1b of the drum by suitable hangers 5b. The feed inlet 6 extends through the wall of the conical portion 1b, and the end thereof is turned upwardly as at 6a to direct the incoming liquid feed material into the cylindrical portion 3c of the tunnel 3a. The concentrate outlet 12 and a clean-out fitting 12a are connected to the lower end of the conical portion 1b of the drum.

The steam inlet 9 and concentrate outlet 10, communicating with the condensing chambers of the heat exchanger 3, extend through the sidewall of the cylindrical body portion 1a of the drum.

The semi eliptical top portion 1c of the drum includes an upwardly-extending dome portion 1f to which the steam outlet 7 is connected. A mesh mist eliminator 1g is mounted in the dome portion 1f, and the semi eliptical portion 1c is also provided with a manway and view port 1h, a fitting 1i adapted to be connected to a liquid level indicator, and a vent fitting 1j.

The drum 1 is supported in a vertical standing position by a plurality of tubular or structural steel legs 26 having their upper end portions welded to the cylindrical portion 1a of the drum, the legs being stabilized by cross braces 26a.

Figure 3:
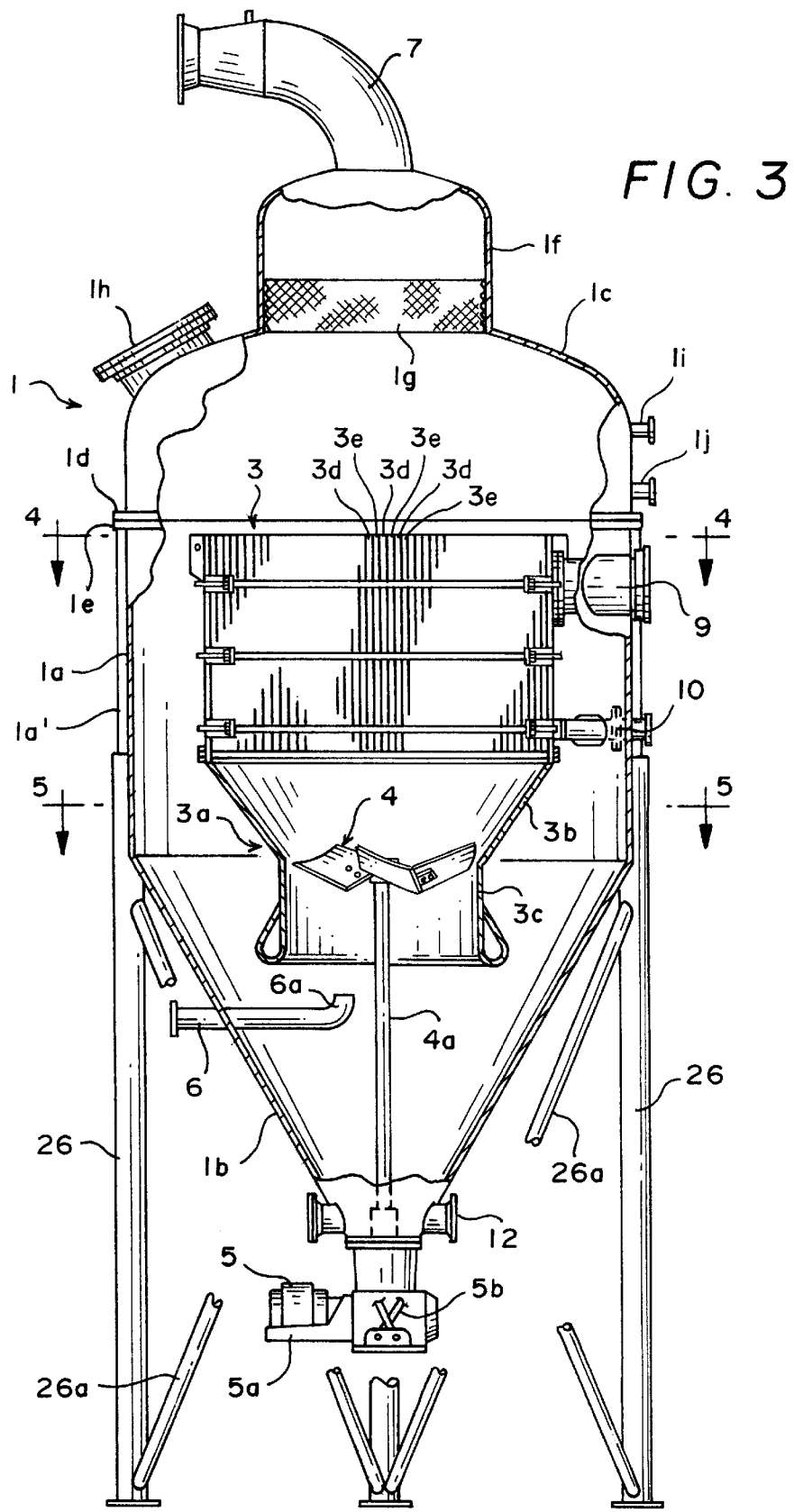
FIG. 3 is a fragmentary, sectional, side elevational view of the boiler drum shown in FIG. 2.
Figure 4:
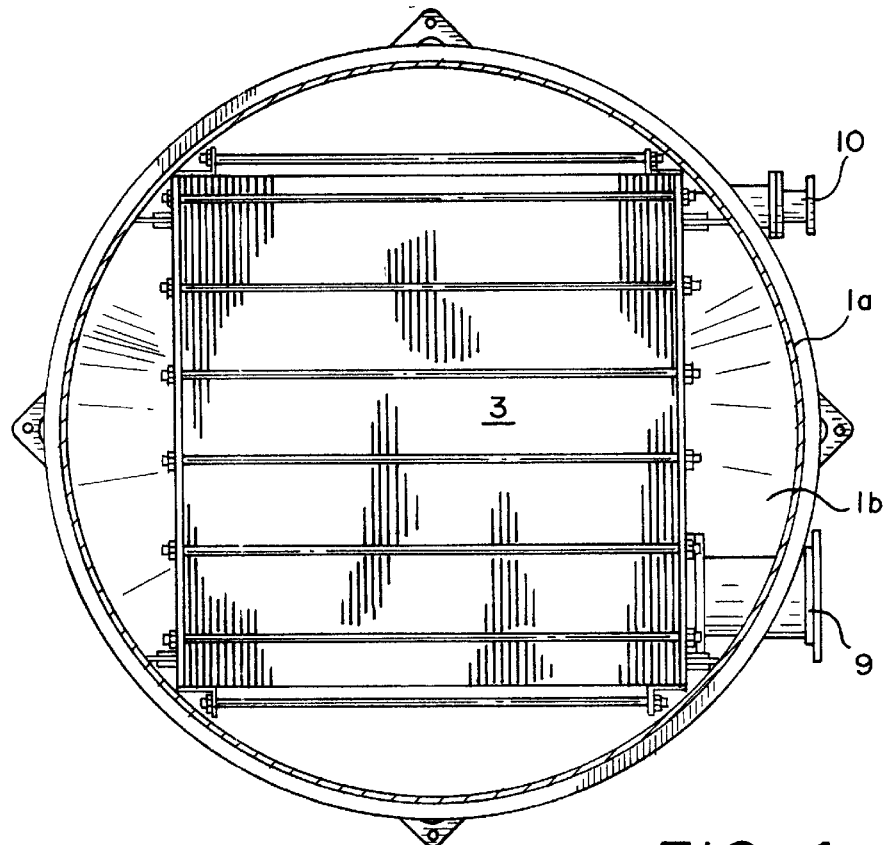
FIG. 4 is a view taken along line 4—4 of FIG. 3.
Figure 5:
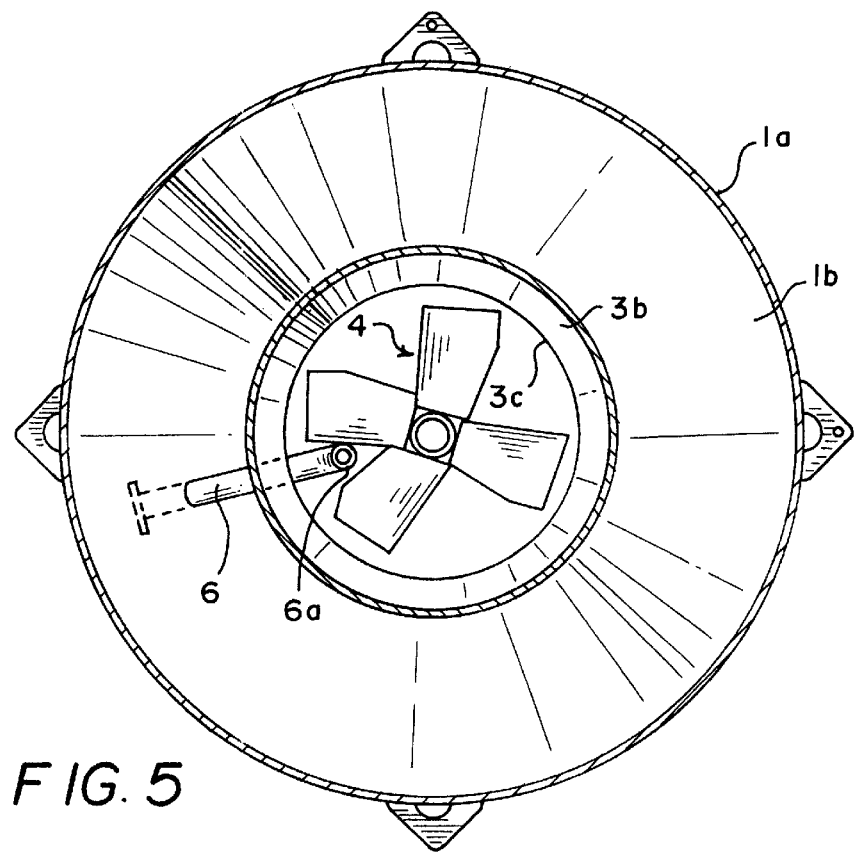
FIG. 5 is a view taken along line 5—5 of FIG. 3.

To explain the operation of the boiler drum 1, it is to be understood by those skilled in the art that the plate-in-frame heat exchanger 3 includes a plurality of alternating boiling and condensing chambers shown diagrammatically in FIG. 3 as at 3d and 3e, whereby the interior surface of each condensing chamber 3e forms a condensing surface, and the exterior surface of each condensing chamber 3e forms a boiling surface for each boiling chamber 3d. The heat exchanger 3 is submerged in a volume of boiling solution 2 as shown in FIG. 1. The condensing chambers 3e are sealed from the boiling solution 2, but the boiling chambers 3d are in free communication with the boiling solution and provide spaces between adjacent condensing chambers 3e to thereby form interpasses for the boiling solution 2 in the drum 1. The impeller 4 circulates the boiling solution 2 through the heat exchanger 3 causing the boiling solution to flow through the interpasses to be heated by the boiling surface of the condensing chambers 3e. A portion of the boiling solution 2 is vaporized, and the vapor flows through the outlet 7 at the top of the drum 1 and into the inlet 9 to the condensing chambers 3e. The condensate from the condensing chambers 3e flows through the condensate outlet 10 while the concentrate from the boiling chambers 3d flow through the concentrate outlet 12.

The impeller 4 causes a continuous circulation of the boiling solution 2 upwardly through the tunnel 3a, through the boiling chambers 3a and then downwardly between the space between the heat exchanger 3 and the sidewall of the cylindrical portion 1a of the drum 1. The impeller 4 imparts sufficient velocity to the boiling solution 2 to prevent suspended solids from accumulating on the boiling surfaces and to inhibit scale formation on the boiling surfaces of the condensing chambers, whereby interference with the efficient operation of the heat exchanger is prevented.

The drum conical portion 1b, the tunnel 3a, and the impeller 4 are all designed such that the flow velocity along the conical drum walls near the bottom of the cone is very low, thus allowing the suspended solids to settle to the bottom and be removed through concentrate outlet 12.

It is to be understood that the form of the invention herewith shown and described is to be taken as a preferred example of the same, and that various changes in the shape, size, and arrangement of parts may be resorted to, without departing from, the spirit of the invention or scope of the subjoined claims.

I claim:

1. A device for processing water having high concentrations of scale forming compounds and high solids content in a high efficiency vapor compression distillation system comprising a boiler drum, a boiling solution contained in said boiler drum, a plate-in-frame heat exchanger mounted in said drum, said plate-in-frame heat exchanger being submerged in said boiling solution, said plate-in-frame heat exchanger having a plurality of alternating boiling chambers and condensing chambers, said boiling chambers being in free communication with the boiling solution in said drum, said condensing chambers being sealed from the boiling solution in said drum, a liquid feed material inlet connected to said drum, a steam outlet mounted on said drum, a steam inlet mounted on said drum communicating with the condensing chambers, means for flowing steam from said drum steam outlet to said steam inlet, a condensate outlet mounted on said drum communicating with the condensing chambers, a concentrate outlet mounted on said drum communicating with said boiling chambers, and an impeller mounted in said drum for circulating the boiling solution through the boiling chambers between adjacent condensing chambers, whereby suspended solids are prevented from accumulating out of the boiling solution and the formation of scale on exterior surfaces of the condensing chambers is inhibited.

2. A device according to claim 1 wherein the drum has a cylindrical body portion, a depending conical portion connected to one end of the cylindrical body portion, and a semi eliptical portion connected to the other end of the cylindrical body portion, said plate-in-frame heat exchanger being positioned in said cylindrical body portion and spaced inwardly from the sidewall thereof, a depending tunnel connected to said plate-in-frame heat exchanger, the impeller being positioned in said tunnel, whereby the boiling solution is circulated upwardly through the boiling chambers of the plate-in-frame heat exchanger and downwardly in the space between the sidewall of the cylindrical body portion of the drum and the plate-in-frame heat exchanger.

3. A device according to claim 1, wherein an inlet feed line is connected to the liquid feed material inlet, a source of scale inhibitor connected to the inlet feed line for feeding scale inhibitor to liquid feed material in said inlet feed line.

4. A device according to claim 1, wherein an inlet feed line is connected to the liquid feed material inlet, a first heat exchanger connected to said inlet feed line, the condensate outlet being connected to said first heat exchanger for preheating liquid feed material from said inlet feed line.

5. A device according to claim 4, wherein a second heat exchanger is connected to said inlet feed line, the concentrate outlet being connected to said second heat exchanger for preheating the liquid feed material.

6. A device according to claim 5, wherein a condensate hot well is connected to the condensate outlet, the first heat exchanger being connected to said condensate hot well.

7. A device according to claim 6, wherein a gas stripper is connected to the first and second heat exchanger for extracting noncondensable gases from the liquid feed material, said gas stripper being connected to the liquid feed material inlet on said drum, a source of vacuum being connected to said gas stripper and said condensate hot well, whereby temperature of the boiling chambers is matched with boiling temperature of the liquid feed material.

8. A device according to claim 7, wherein a make-up heater is connected to said gas stripper and to said liquid feed material inlet on said drum.

9. A device according to claim 5, wherein a wiped film evaporator is connected to the concentrate outlet on said drum, a third heat exchanger connected to said wiped film evaporator, said third heat exchanger being connected to the liquid feed material inlet.

* * * * *

UNITED STATES PATENT AND TRADEMARK OFFICE
CERTIFICATE OF CORRECTION

PATENT NO. : 5,810,976

DATED : Sept. 22, 1998

INVENTOR(S) : Robert C. Keith

It is certified that error appears in the above-identified patent and that said Letters Patent is hereby corrected as shown below:

On the title page, item [73], should read
Assignee: Grano Environmental Corporation Signed and Sealed this Fifth Day of January, 1999

Attest:

Attesting Officer

*Acting Commissioner of Patents and Trademarks*